United States Patent [19]

Schwaiger

[11] 4,175,410
[45] Nov. 27, 1979

[54] VEHICLE WHEEL ENGAGEABLE BLOCKING DEVICE

[76] Inventor: John E. Schwaiger, 7556 Raleigh-LaGrange Rd., Cordova, Tenn. 38018

[21] Appl. No.: 848,279

[22] Filed: Nov. 3, 1977

[51] Int. Cl.² ............................................. B60R 25/00
[52] U.S. Cl. .................................................. 70/226
[58] Field of Search ................. 70/18, 19, 54, 56, 225, 70/226, 227, 233

[56] References Cited

U.S. PATENT DOCUMENTS

| 563,991 | 7/1896 | Thomas | 70/226 |
|---|---|---|---|
| 1,488,893 | 4/1924 | Plouffe | 70/226 |
| 1,507,069 | 9/1924 | Klaila | 70/227 |
| 1,671,602 | 5/1928 | Morris | 70/18 |

Primary Examiner—Robert L. Wolfe
Attorney, Agent, or Firm—John R. Walker, III

[57] ABSTRACT

Subject device includes a pair of companionate arcuate arms which (when locked) circumferentially embrace the wheel with one of the arms being movable to an open position to facilitate initial engagement with the wheel. A chassis-strikable lock-bar is fixedly attached to the arcuate arms for making forceable contact with the frame structure of the vehicle as a result of any movement thereof. Thus, the lockbar impedes any significant movement of the vehicle, i.e., whether it be inadvertent or unwarranted. A typical padlock locks the arms together in their closed position and an encasement closely envelopes the padlock shielding it against unwarranted abuse and destruction.

6 Claims, 9 Drawing Figures

VEHICLE WHEEL ENGAGEABLE BLOCKING DEVICE

BACKGROUND OF THE INVENTION

1. Field of the Invention

This invention relates to the field of vehicle anti-theft devices and is particularly directed toward such a device that also offers the advantage of preventing inadvertent movement of the vehicle when parked on sloping terrain.

2. Description of the Prior Art

Vehicle locking devices have been in existence for at least a half century as evidenced by a patent to Plouffe, U.S. Pat. No. 1,488,893. Other more recent U.S. patents for such locking devices have been disclosed in the following U.S. patents:

U.S. Pat. No. 3,805,564 to Velardo; U.S. Pat. No. 3,844,146 to Fouces; and U.S. Pat. No. 3,907,072 issued to Shafer. None of the above-mentioned patents suggest or disclose applicant's device.

With the ever increasing population and the vast number of vehicles on the highways including recreational vehicles, trucks and trailers, motor homes and the like, greater emphasis is constantly being directed towards safety on the highways. Travel trailers and the like usually depend upon the towing vehicle for actuation of any braking system incorporated therewith. This presents problems when the travel trailer is disconnected from the towing vehicle. Oftentimes vehicle breakdowns occur in mountaineous terrain requiring the travel trailer to be disconnected from the towing vehicle and left unattended on sloping terrain. Obviously, this is a definite safety hazard which, if possible, should be eliminated.

In addition, unattended travel trailers and boats resting on trailers and the like, are generally easily stolen since these vehicles usually do not include or incorporate antitheft devices.

SUMMARY OF THE INVENTION

The present invention is directed towards overcoming the disadvantages and problems relative to previous vehicle locking devices. The concept of the present invention is to provide a locking device for lockable engagement with merely one wheel of the vehicle and which serves a dual purpose, that being, eliminating the hazards associated with a disconnected trailer and/or other type vehicle which may have a faulty brake system. The vehicle could be a travel trailer, boat trailer, truck, motor home or automobile and the like. The hazard, for the most part, is experienced when the vehicle is parked on sloping terrain.

The locking device includes a pair of companionate arcuate shaped arms for capturing the device to the wheel of the vehicle with the pair of arms being engageable with the tread of the wheel by circumferentially embracing traversely the periphery thereof. The arms are adapted to selectively be opened to facilitate initial engagement with the wheel and to be closed when embracing the wheel. A lock-bar is included which is attached to the pair of arms and which is disposed in an essentially parallel arrangement with respect to the rotating axis of the wheel for preventing rotation of the wheel in an unusual manner. The lock-bar includes a chassis-strikable portion defined by an inwardly reaching end thereof for making forceable contact with chassis structure of the vehicle whereby movement of the vehicle is impeded as rotation of the wheel is attempted, although prevented. Locking apparatus is incorporated with the device for precluding unjustifiable movement of the arms from their closed position.

DESCRIPTION OF THE PREFERRED EMBODIMENT

Figure 1:
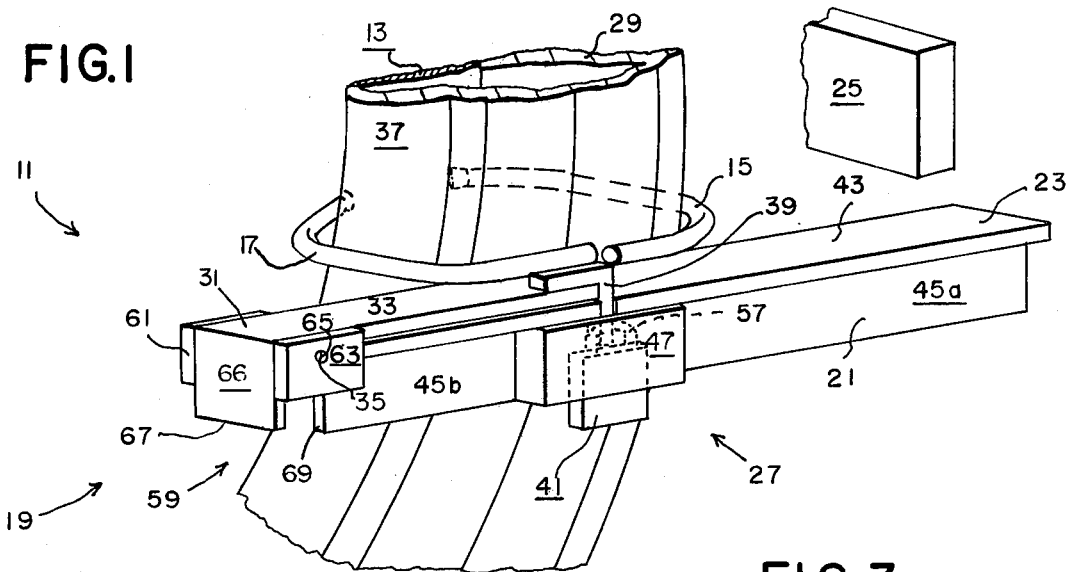
FIG. 1 is a perspective view of the locking device of the present invention shown attached to a wheel and with an adjacent frame member of the vehicle being depicted.
Figure 2:
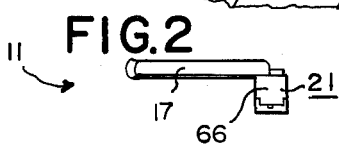
FIG. 2 is an end view of the locking device of the present invention taken from the left side of FIG. 1.
Figure 6:
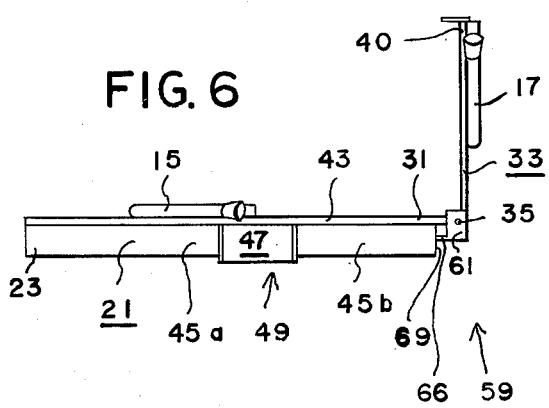
FIG. 6 is an elevation view taken as on the line VI—VI of FIG. 5 with certain structure thereof being shown in FIG. 6 in an open position.
Figure 7:
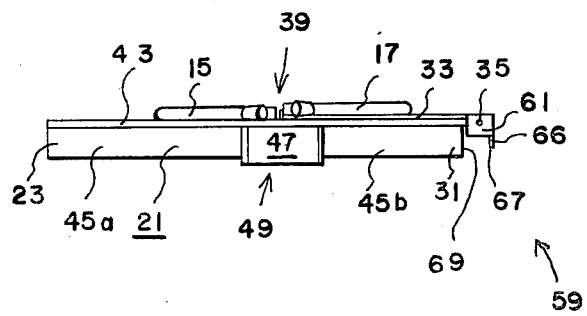
FIG. 7 is an elevation view similar to FIG. 6 with the structure alluded to being in a closed position.
Figure 8:
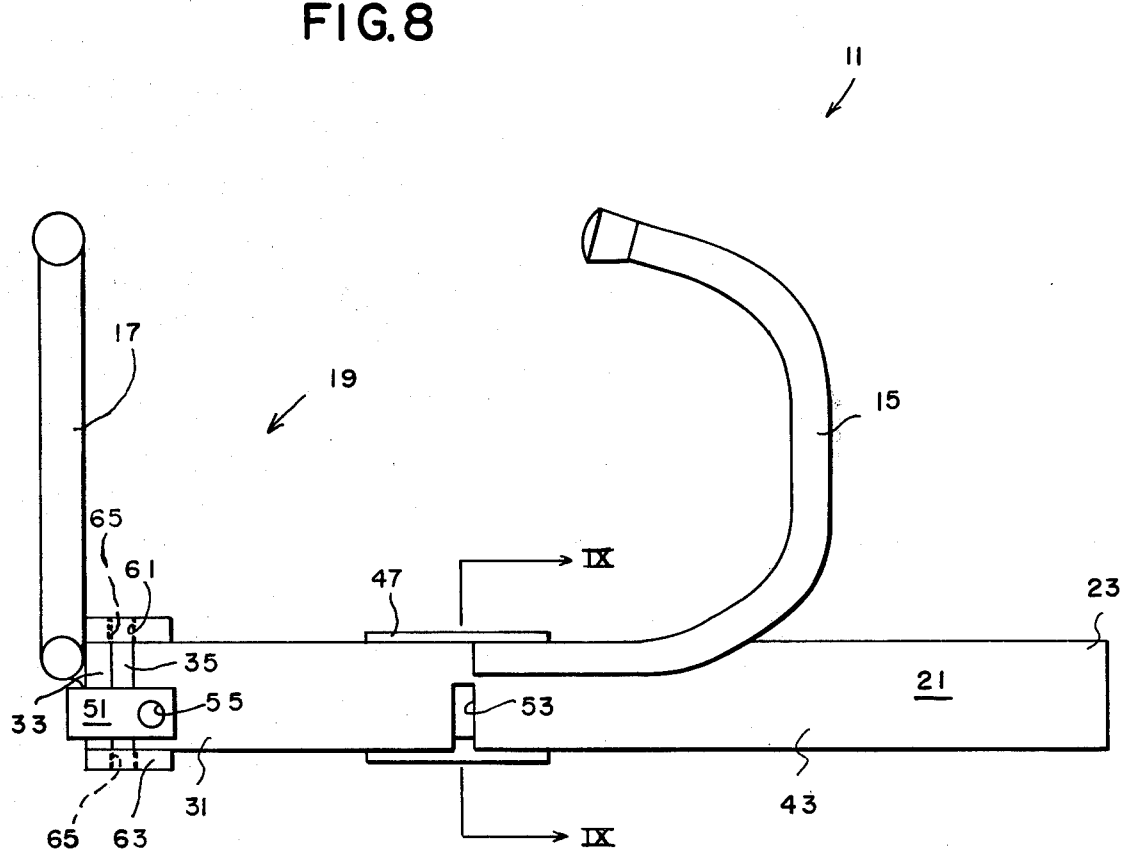
FIG. 8 is an enlarged top view taken as looking down in FIG. 1 with the structure alluded to above being in the open position.

The locking device 11 of the present invention is intended for lockable engagement with merely one wheel of a vehicle, as at 13, as shown in FIG. 1 of the drawings, i.e., the remainder of the vehicle is not shown. The locking device 11 includes a pair of companionate arcuate shaped arm means, i.e., an inner arm 15 and an outer arm 17, for capturing the device 11 to the wheel of the vehicle 13 in a manner to be fully disclosed. The pair of arm means 15, 17 are engageable (by extending across) the tread of the wheel by circumferentially embracing the periphery thereof, i.e., by extending across the tread of the wheel 13 in the manner as clearly shown in FIG. 1 of the drawings. The device 11 also includes means, generally indicated at 19, for enabling the pair of arms 15, 17 to selectively be opened, as shown in FIG. 6 and 8, thus facilitating initial engagement thereof with the wheel 13; and to be closed, as shown in FIG. 1 et al, when embracing the wheel 13, i.e., with removal from the wheel being precluded. Also included is lock-bar means 21 which is attached to the pair of arm means 15, 17, in a manner to be fully disclosed. The lock-bar means 21 is intended to be disposed in an essentially parallel arrangement with respect to the rotating axis of the wheel 13 for preventing rotation of the wheel, in a manner to be more apparent as the specification proceeds. The lock-bar means 21 includes chassis-strikable means defined by an inwardly reaching end thereof, characterized as at 23, for making forceable contact with chassis structure, characterized by the numeral 25, of the vehicle whereby moveof the vehicle is impeded as rotation of the wheel 13 is initiated, although prevented. Also included is fastener/lock means as at 27 for precluding unjustifiable movement of the arm means 15, 17 from the closed position thereof.

As previously mentioned, the lock-bar means 21 includes the inwardly reaching end or chassis-strikeable means 23 which reaches a predetermined distance inwardly or specifically beyond the inner side-wall, as at 29, of the wheel 13. Additionally, the lock-bar means 21 includes an outer end, as at 31, the significance of which will be disclosed below. The inner arcuate arm means 15 is disposed substantially intermediate the lock-bar means 21 and is fixedly attached thereto in any well-known manner as by welding or the like, for contiguous engagement with the inner side-wall 29 of the wheel 13.

The means 19 alluded to above for enabling the arms 15, 17 to be opened, preferably includes hingeplate means 33 hingedly attached as with a pivot pin 35 or the like at the outer end 31 of the lock-bar means 21. Thus, this enables arms 15, 17 to be opened or to facilitate installing the locking device 11 onto the wheel 13, i.e., the hingeplate means 33 is movable between a locked position shown in FIG. 1 et al of the drawings and an unlocked position shown in FIGS. 6 and 8 of the drawings. Accordingly, the outer arcuate arm means 17 is fixedly attached to the hingeplate means 33 for movement therewith and for contiguous engagement with the outer side-wall, as at 37, of wheel 13 when the hingeplate means 33 is in the above-mentioned locked position.

The fastener/lock means 27 alluded to above preferably includes fastener, or hasp means, as at 39, for removably joining or coupling the hingeplate means 33, specifically a free end as at 40 thereof, and the lock-bar means 21 one with the other; and lock means, e.g., padlock means 41 or the like, engageable with the hasp means 39 for precluding unjustifiable movement of the hingeplate means 33, i.e., from the previously mentioned locked position to the unlocked position.

Figure 3:
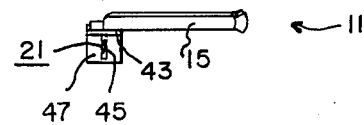
FIG. 3 is an end view of the locking device with the view being taken from the right side of FIG. 1.

From FIGS. 1 and 3 of the drawings, it may be seen that the chassis-strikable means 23 defined by the inwardly reaching end of the lock-bar means 21 is constructed in a rigid teeshape in cross-section for precluding the likelihood of circumventing the device 11 by deforming or bending the lock-bar means 21 through forceable movement of the vehicle. In other words, the lock-bar means 21 preferably includes a horizontally disposed platelike member 43 which is fixedly attached, in any well-known manner (as by welding or the like) to a vertical platelike member 45 which is intermediately disposed along the width of the horizontal platelike member 43 and extends substantially conterminously therewith.

Figure 9:
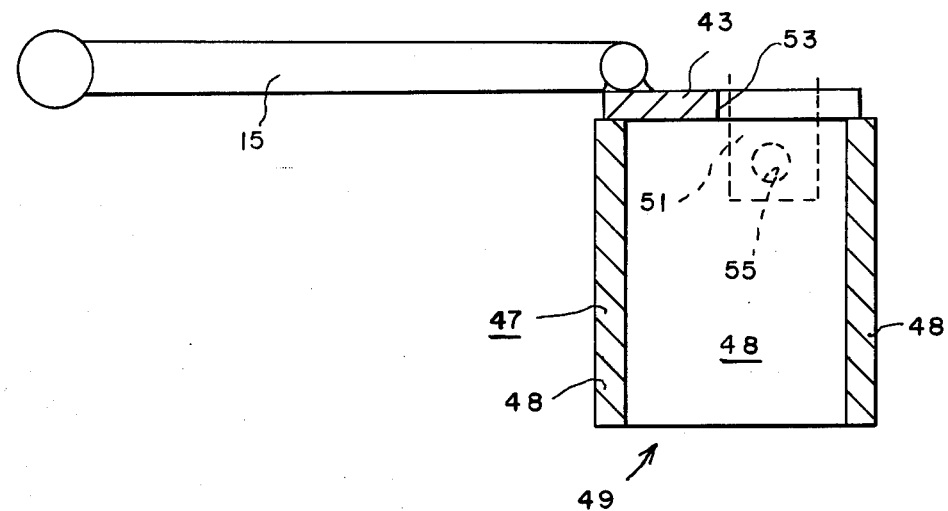
FIG. 9 is a sectional view taken as on the line IX—IX of FIG. 8 and rotated 90 degrees with certain structure being shown in broken lines to depict a closed position.

The padlock 41 preferably is selected from the various usual selections so as to have a predetermined size for reasons about to be disclosed. The locking device 1 preferably includes encasement means, as at 47, which is fixedly attached (as by welding or the like) to the lock-bar means 21 and is compatibly sized with respect to the padlock 41 for closely enveloping (at least in part) the padlock 41. Thus, the likelihood of an attempt to obviate the effectiveness of the padlock 41 through the use of typical bolt cutters and/or by applying violent blows thereto with a hammer is obviated. From FIG. 9 of the drawings it may be seen that the encasement means 47 includes a continuous wall 48 terminating at the lower end thereof so as to define a downwardly directed opening as at 49, i.e., through which the padlock 41 may freely be passed when installing and/or removing the padlock 41.

The fastener or hasp means 39 includes a tab member as at 51, which is fixedly attached to the hingeplate means 33, in any well-known manner (as by welding or the like). The lock-bar means 21 is provided with a slot as at 53 leading into the encasement means 47 for receiving the tab member 51 as clearly indicated in FIG. 9 of the drawings, i.e., the tab member 51 being shown in broken lines. The tab member 51 is provided with an aperture 55 disposed adjacent the free end thereof and which is extendable into the encasement means 47 as clearly shown in FIG. 9 of the drawings, for receiving the shackle, as at 57, FIG. 1, of the padlock 41.

It should be understood that the encasement means 47 interrupts the vertical platelike member 45. Therefore, the platelike member 45 in actuality includes an inner element 45a and an outer element 45b with the encasement means 47 being interposed therebetween, as best shown in FIGS. 1, 4 of the drawings.

The locking device 11 also includes stop means, as at 59, for limiting the movement of the hingeplate means 33 when it is being moved to the unlocked position. More specifically, the hingeplate means 33 includes a pair of confrontingly arranged gusset plates 61, 63 which are provided with aligned apertures 65 for receiving the pivot pin 35 as clearly shown in FIG. 1 et al of the drawings. The stop means 59 is established by a tab member 66 having a predetermined length so as to enable the lowermost portion thereof, as at 67, to engage the outermost end, as at 69, of the previously mentioned outer element 45b, i.e., when the arms 15, 17 are in the fully opened position as shown in FIGS. 6 and 8 of the drawings.

It will be appreciated by those skilled in the art that the encasement means 47 inherently adds strength to the lock-bar means 21 since the inner end of the elements 45a, 45b are fixedly attached, as by welding or the like, to the encasement means 47. Also the gusset plates 61, 63 and the tab member 66 are preferably welded one to the other so as to enhance the strength of the hingeplate means 33 and the stop means 59.

Figure 4:
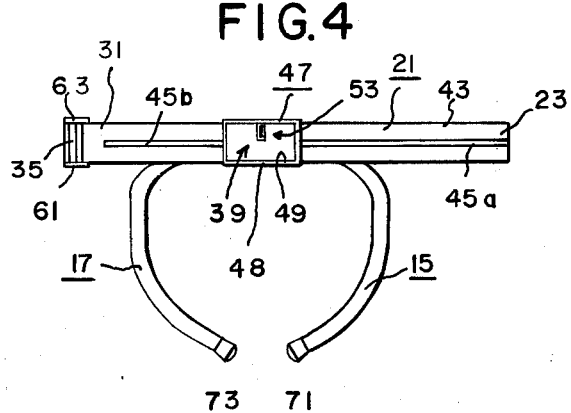
FIG. 4 is a bottom view with the view being taken as looking up in FIG. 1.
Figure 5:
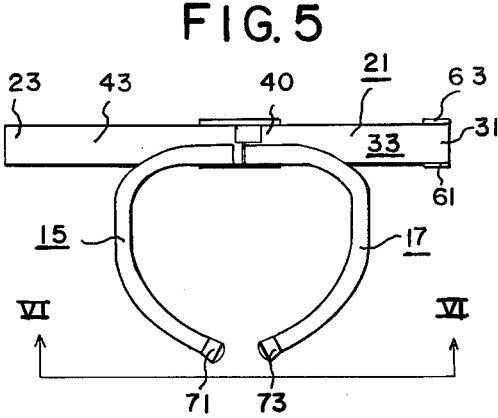
FIG. 5 is a top view taken as looking down in FIG. 1 and rotated 180 degrees.

From FIGS. 4 and 5 of the drawings it may clearly be seen that the inner and outer arcuate arm means 15, 17 respectively include free ends, as at 71, 73. The free ends 71, 73 have a predetermined spaced apart distance therebetween when the hingeplate means 33 is in its locked position. The predetermined spaced apart distance alluded to above is minimal to insure that the lock means 41 may not be circumvented when the device 11 is attached to the wheel 13, which has a pneumatic tire thereto attached, i.e., by simply deflating the tire in an attempt to facilitate unjustifiable removal of the locking device 11. In other words, the free ends 71, 73 would extend well within the inner and outer circumferences of the rim to which the tire is attached. Therefore, the locking device 11 could not be removed from a wheel to which it may be attached even through the tire is deflated, or for that matter even though the tire might be completely removed from the wheel.

It should be understood that the locking device 11 is effective without respect to direction of rotation of the wheel since rotation in one direction makes immediate contact with the frame or chassis structure 25. Although, rotation of the wheel 13 in the opposite direction simply causes the wheel 13 to pass over the locking device 11 which is carried up to the backside where it will make forceable contact with the frame or chassis structure 25 in somewhat the same manner as shown in FIG. 1 and previously described.

From the above disclosure it should now readily be apparent that the device 11 will prevent theft of the vehicle by locking the wheel 13, thus rendering the vehicle immovable. Additionally, the device 11 will prevent the vehicle from moving accidentally, thus preventing bodily harm or property damage as a result thereof. Further, the device 11 can be adapted to substantially any size tire and rim combination making it a valuable accessory for all vehicles, i.e., cars, trucks, recreational vehicles of all kinds, motorcycles, horse trailers, boat trailers, utility trailers and the like.

The locking device 11 not only works well on single axle vehicles but works equally well on tandem axle vehicles. Further, the device 11 is equally effective on wheels having inflated or deflated tires thereto attached.

The locking device 11 preferably is made up of hardened steel and since it is simple in design it can be manufactured economically and is virtually maintenance free. Additionally, the locking device 11 occupies little space while not in use and is easily installed. Further, it offers positive foolproof operation and unlimited trouble-free service.

Although the invention has been described and illustrated with respect to a preferred embodiment thereof, it should be understood that it is not to be so limited since changes and modifications may be made therein which are within the full intended scope of the invention.

I claim:

1. A locking device for lockable engagement with a vehicle wheel, said locking device comprising lock-bar means for thwartable engagement with merely one wheel of the vehicle whereby movement of the vehicle is impeded therewith, said lock-bar means intended to be disposed in an essentially parallel arrangement with respect to the rotating axis of the wheel and includes inner and outer ends with the inner end thereof reaching a predetermined distance beyond the inner side-wall of the wheel, inner arcuate arm means disposed substantially intermediate said lock-bar means and being fixedly attached thereto for contiguous engagement with the inner side-wall of the wheel, hingeplate means hingedly attached at the outer end of said lock-bar means for facilitating installing said locking device onto the wheel with said hingeplate means being movable between locked and unlocked positions, outer arcuate arm means fixedly attached to said hingeplate means for movement therewith and for contiguous engagement with the outer sidewall of the wheel when said hingeplate means is in the locked position thereof, hasp means for coupling said hingeplate means and said lock-bar means one with the other, and lock means engageable with said hasp means for precluding unjustifiable movement of said hingeplate means.

2. The locking device as set forth in claim 1, in which said lock-bar means includes chassis-strikable means defined by said inner end thereof for making forceable contact with chassis structure of the vehicle whereby movement thereof is impeded, said chassis-strikable means having a rigid tee-shape in cross-section for precluding the likelihood of circumventing said device by deforming said lock-bar means through forceable movement of the vehicle.

3. The locking device as set forth in claim 1, in which said lock means consists of a typical padlock having a predetermined size, and in which is included encasement means fixedly attached to said lock-bar means and being compatibly sized with respect to said padlock for closely enveloping at least in part said padlock to prevent the likelihood of an attempt to obviate the effectiveness of said padlock through the use of typical bolt cutters and/or by applying violent blows with a hammer, said encasement means having a downwardly directed opening through which said padlock may freely be passed.

4. The locking device as set forth in claim 1, in which is included stop means for limiting the movement of said hingeplate means when being moved to the unlocked position thereof.

5. The locking device as set forth in claim 3, in which said hasp means includes a tab member fixedly attached to said hingeplate means with said lock-bar means being provided with a slot leading into said encasement means for receiving said tab member, said tab member being provided with an aperture disposed adjacent the free end thereof and which is extendable into said encasement means for receiving the shackle of the padlock.

6. The locking device as set forth in claim 1, in which said inner and outer arcuate arm means respectively include free ends having a predetermined spaced apart distance therebetween when said hingeplate means is in the locked position thereof, said predetermined spaced apart distance being minimal to insure that said lock means may not be circumvented when said device is attached to wheels having a pneumatic tire thereto attached by simply deflating the tire in an attempt to facilitate unjustifiable removal of the locking device.

* * * * *